(No Model.)
M. R. WOLCOTT.
WHEEL FOR VEHICLES.
No. 493,419. Patented Mar. 14, 1893.
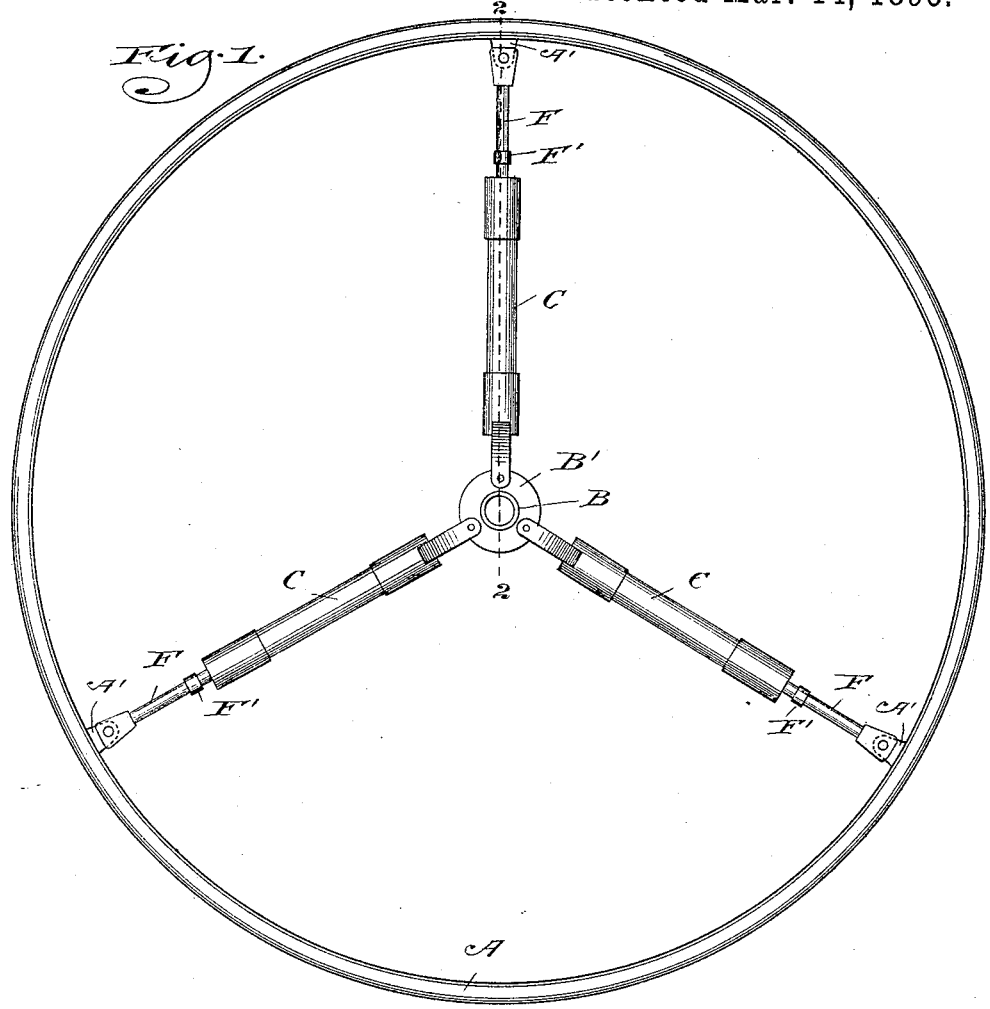
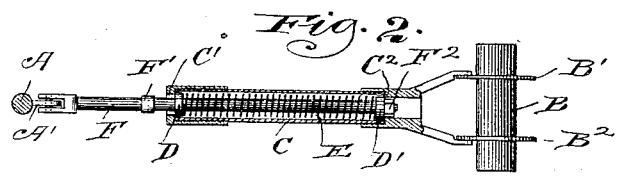
Witnesses. Inventor;

UNITED STATES PATENT OFFICE.

MARCUS R. WOLCOTT, OF ROCKFORD, ILLINOIS.

WHEEL FOR VEHICLES.

SPECIFICATION forming part of Letters Patent No. 493,419, dated March 14, 1893.

Application filed December 19, 1892. Serial No. 455,685. (No model.)

*To all whom it may concern:*

Be it known that I, MARCUS R. WOLCOTT, a citizen of the United States, residing at Rockford, in the county of Winnebago and State of Illinois, have invented certain new and useful Improvements in Wheels for Vehicles, of which the following is a specification.

My invention relates specifically to the production of a wheel the hub whereof is supported by means of springs, which connect the same with the inner ends of the spokes thereof; and it consists of certain new and useful features of construction and combinations of parts hereinafter fully described and specifically pointed out in the claims.

Referring to the accompanying drawings, which form a part of this specification, Figure 1 is a side elevation of a wheel embodying my improvements. Fig. 2 is a partial section, at the dotted line 2....2 in Fig. 1, of parts there shown.

Like letters of reference indicate corresponding parts throughout the several views.

A is the rim of the wheel, which may be of any suitable form—in cross-section—and construction and is provided with lugs A' integral or rigidly connected therewith and projecting radially inward from the inside thereof.

B is the hub of the wheel and is furnished with annular flanges B' B² projecting from the periphery thereof at right angles thereto.

C are radial sockets pivot-jointed by their inner ends to the flanges B' B² of the hub B and provided interiorly with concentric annular collar-bearings C' C².

D D' are loose collars, adapted to be freely slid, in the sockets C, and engage with and be disengaged from the annular collar-bearings C' C² therein.

E is a spring interposed between the inner faces of the loose collars D D' and normally holding them in contact with the collar bearings C' C² of the socket C.

F are spokes, pivot-jointed by their outer ends to the lugs A' on the rim A, inserted into the sockets C and through the loose collars D D' and springs E, wherethrough they may be freely slid, and being provided with fast collars or nuts F' F² adapted to engage with the outer faces of the loose collars D D'.

Whenever weight is placed upon an axle (not shown) inserted into the hub B, the latter is supported by the joint operation of all the springs E. Supposing the spokes of the wheel to be in the relative positions shown in Fig. 1, the operation of the springs would be as follows. The hub and inclined radial sockets C descend under the stress of weight, the fast collars F' on the two lower spokes F stop the downward travel of the loose washers D and springs E, thereby furnishing support for the hub B and its weight. Simultaneously with the descent of the two lower sockets, the upper socket and its spring descend until the latter is arrested, by the fast collar or nut F² on the inner end of vertical spoke, and caused to contribute to the support of the hub B and its weight. Obviously as the wheel revolves the weight borne by the hub B is transmitted first to one end and then to the other of the springs E, thus forming flexible bearings for the hubs and insuring an easy, vertically-reciprocating motion to a vehicle supported thereby.

I claim—

1. In a wheel for vehicles, in combination, a rim, a hub, radial sockets pivot-jointed by their inner ends to the hub, spokes pivot-jointed by their outer ends to the rim and inserted into the radial sockets, and springs so connecting the sockets and spokes as to form flexible bearings for the hub, substantially as and for the purpose specified.

2. In a wheel for vehicles, in combination, the wheel rim provided with inwardly-projecting radial lugs, the hub furnished with annular flanges projecting from the periphery thereof at right angles thereto, the radial sockets pivot-jointed by their inner ends to the hub-flanges and provided interiorly with concentric annular collar-bearings, the loose collars adapted to be freely slid in the sockets and engage with and be disengaged from the annular bearings therein, the springs interposed between the inner faces of the loose collars, the spokes, pivot-jointed by their outer ends to the rim-lugs, inserted into the sockets and through the loose collars and the springs, and being provided with fast collars adapted to engage the outer faces of the loose collars and press them inward against the springs, substantially as and for the purpose specified.

MARCUS R. WOLCOTT.

Witnesses:
L. L. MORRISON,
NELLIE BUNKER.